United States Patent [19]

Earl et al.

[11] Patent Number: 5,310,609
[45] Date of Patent: May 10, 1994

[54] BATTERY CELL TERMINAL SEAL/INTERCELL CONNECTOR

[75] Inventors: Martin W. Earl, Silver Spring; Ronald R. Kessler, Mt. Airy; Max A. Morris, Frederick, all of Md.

[73] Assignee: Comsat, Bethesda, Md.

[21] Appl. No.: 66,207

[22] Filed: May 25, 1993

[51] Int. Cl.⁵ .................... H01M 2/24; H01M 2/08
[52] U.S. Cl. .................. 429/160; 429/101; 429/174; 429/181; 429/185
[58] Field of Search ............. 429/101, 160, 161, 174, 429/179, 181, 185

[56] References Cited

U.S. PATENT DOCUMENTS

| | | |
|---|---|---|
| 4,115,630 | 9/1978 | Van Ommering et al. |
| 4,683,178 | 7/1987 | Stadnick et al. |
| 4,923,769 | 5/1990 | Jones et al. |
| 4,957,830 | 9/1990 | Jones . |
| 5,082,754 | 1/1992 | Jones . |
| 5,090,612 | 2/1992 | Jones . |
| 5,135,824 | 8/1992 | Jones et al. .............. 429/181 X |

Primary Examiner—John S. Maples
Attorney, Agent, or Firm—Sughrue, Mion, Zinn, Macpeak & Seas

[57] ABSTRACT

An intercell connector for electrically interconnecting a plurality of battery cells, each of the battery cells including a plurality of spaced apart positive and negative electrode plates encased in a plastic casing. The intercell connector includes first and second buss bars disposed in spaced apart relation to each other and each including a base portion and an electrode connecting portion extending from the base portion, the base portions of the first and second buss bars respectively including first and second electrode terminals aligned with each other; and an insulator for insulating the first and second buss bars from each other. The connector is disposed in the casing of each of the cells so as to extend transversely to the electrode plates with the casing being bonded to a portion of the insulator such that only the electrode terminals are exposed outside the casing. The first electrode terminal includes a female connecting portion and the second electrode terminal includes a male connecting portion to facilitate interconnection of adjacent cells. Additionally, the electrode connecting portions of the first and second buss bars are respectively electrically connected to the positive and negative electrode plates. The intercell connector further includes a spacer disposed between the buss bars for maintaining a space between the buss bars.

12 Claims, 4 Drawing Sheets

BATTERY CELL TERMINAL SEAL/INTERCELL CONNECTOR

BACKGROUND OF THE INVENTION

1. Field of the Invention

The present invention relates to an intercell connector which is used in the construction of a CPV (common pressure vessel) battery. More particularly, the invention relates to a connector which respectively electrically interconnects the positive and negative electrodes of a particular cell to external positive and negative terminals so that adjacent cells can be electrically interconnected.

2. Background

The earliest Ni-H$_2$ batteries for satellite application employed individual pressure vessels for each cell in the battery. However, to gain improvements in specific energy and energy density and to reduce the total weight and volume of the battery, the recent trend has been to incorporate multiple cells in a stack arrangement within a single pressure vessel. This type of Ni-H$_2$ battery is termed in the art a common pressure vessel (CPV) battery. Examples of common pressure vessel type Ni-H$_2$ batteries are described in the following publications: M. Earl et al., "Design and Development of an Aerospace CPV Ni/H$_2$ Battery", 24th Intersociety Energy Conversion Engineering Conference, Washington, D.C., August 1989, Proc., Vol. 3, pp. 1395-1400; J. Dunlop et al., "Making Space Nickel/Hydrogen Batteries Light and Less $e Expensive", AIAA/DARPA Meeting on Lightweight Satellite Systems, Monterey, Calif., August 1987, NTIS No. N88-13530; G. Holleck, "Common Pressure Vessel Nickel-Hydrogen Battery Design", 15th Intersociety Energy Conversion Engineering Conference, Seattle, Wash., August 1980, Proc.. Vol. 3, pp. 1908-1911; and E. Adler et al. "Design Considerations Related to Nickel Hydrogen Common Pressure Vessel Battery Modules", 21st Intersociety Energy conversion Engineering Conference, San Diego, Calif., August 1986, Proc., Vol. 3, pp. 1554-1559.

In CPV batteries, the individual cells are generally disposed inside an insulating carrier. Each battery cell includes a plurality of positive and negative electrodes which are encased in a plastic casing or the like. Within each cell, the positive and negative electrodes are respectively interconnected to one another utilizing positive and negative buss bars. In order to electrically connect adjacent cells, it is necessary that the positive and negative buss bars be respectively connected to positive and negative terminals disposed externally of the casing. In this manner, adjacent cells can be interconnected to one another as necessary to satisfy specific voltage requirements.

In order to connect the internally disposed buss bars to the external terminals, it is necessary to provide openings in the casing. With the conventional cell design, it has been difficult to adequately seal the casing in the area circumscribing the openings to prevent leakage of the electrolyte liquid disposed in the casing. One known sealing technique involves providing a seal between each of the buss bars and the casing and a belleville washer externally of the casing for compressing the casing against the buss bars with the seal interposed therebetween. However, such a technique has not been successful in adequately preventing leakage so that the life of the battery is shortened.

SUMMARY OF THE INVENTION

It is therefore an object of the invention to provide an intercell connector for use in a common pressure vessel type Ni-H$_2$ battery which experiences minimal leakage of the liquid electrolyte from the casing of the cells thus extending the life of the battery.

In accordance with the above and other objects, the invention provides an intercell connector for electrically interconnecting a plurality of battery cells, each of the battery cells including a plurality of spaced apart positive and negative electrode plates encased in a plastic casing. The intercell connector comprises first and second buss bars disposed in spaced apart relation to each other and each including a base portion and an electrode connecting portion extending from the base portion, the base portions of the first and second buss bars respectively including first and second electrode terminals aligned with each other; and an insulator for insulating the first and second buss bars from each other.

According to the invention, the connector is disposed in the casing of each of the cells so as to extend transversely to the electrode plates with the casing being bonded to a portion of the insulator such that only the electrode terminals are exposed outside the casing. The first electrode terminal includes a female connecting portion and the second electrode terminal includes a male connecting portion to facilitate interconnection of adjacent cells.

Additionally, the electrode connecting portions of the first and second buss bars are respectively electrically connected to the positive and negative electrode plates. The intercell connector further includes a spacer disposed between the buss bars for maintaining a space therebetween. The insulator is made of a plastic which adheres well to metal and encapsulates the buss bars excluding the electrode connecting portions and the electrode terminals.

DESCRIPTION OF THE PREFERRED EMBODIMENTS

Preferred embodiments of the invention will now be described with reference to the attached drawings.

Figure 1:
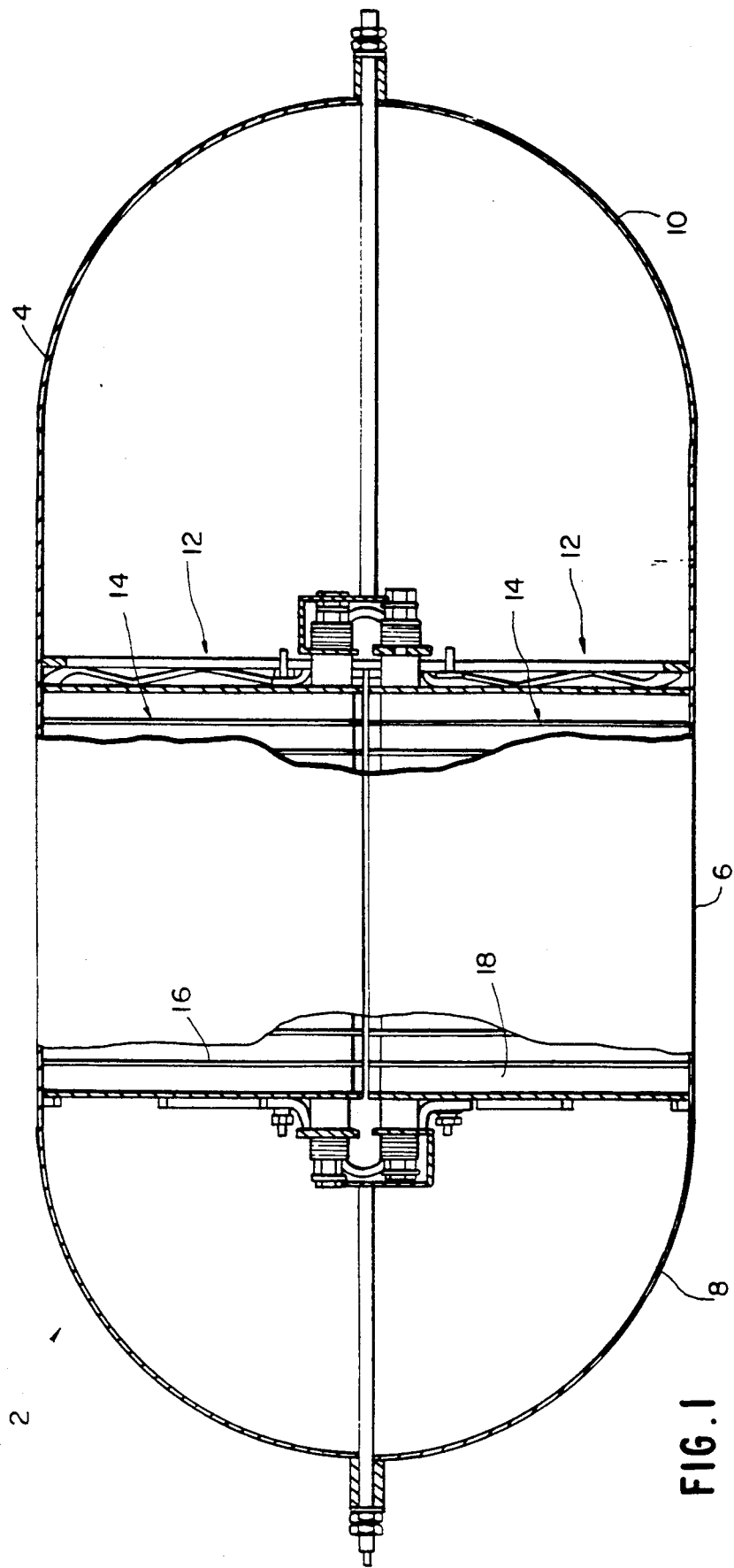
FIG. 1 is a partially cut-away cross-sectional view of a common pressure vessel type Ni-H$_2$ battery according to the present invention.

FIG. 1 illustrates the general arrangement of the Ni-H$_2$ battery 2 including a pressure vessel 4 comprised of a central cylindrical portion 6 capped at respective ends by semi-spherical end portions 8 and 10. Two identical cell stacks 12 are mounted adjacent one another within the pressure vessel 4. Each of the cell stacks 12 includes a cell rack 14 which has a generally semi-cylindrical outer configuration. The interior of the cell rack 14 is divided by walls or fins 16 into cell-receiving compartments in which are disposed the individual battery cells 18.

Figure 2:
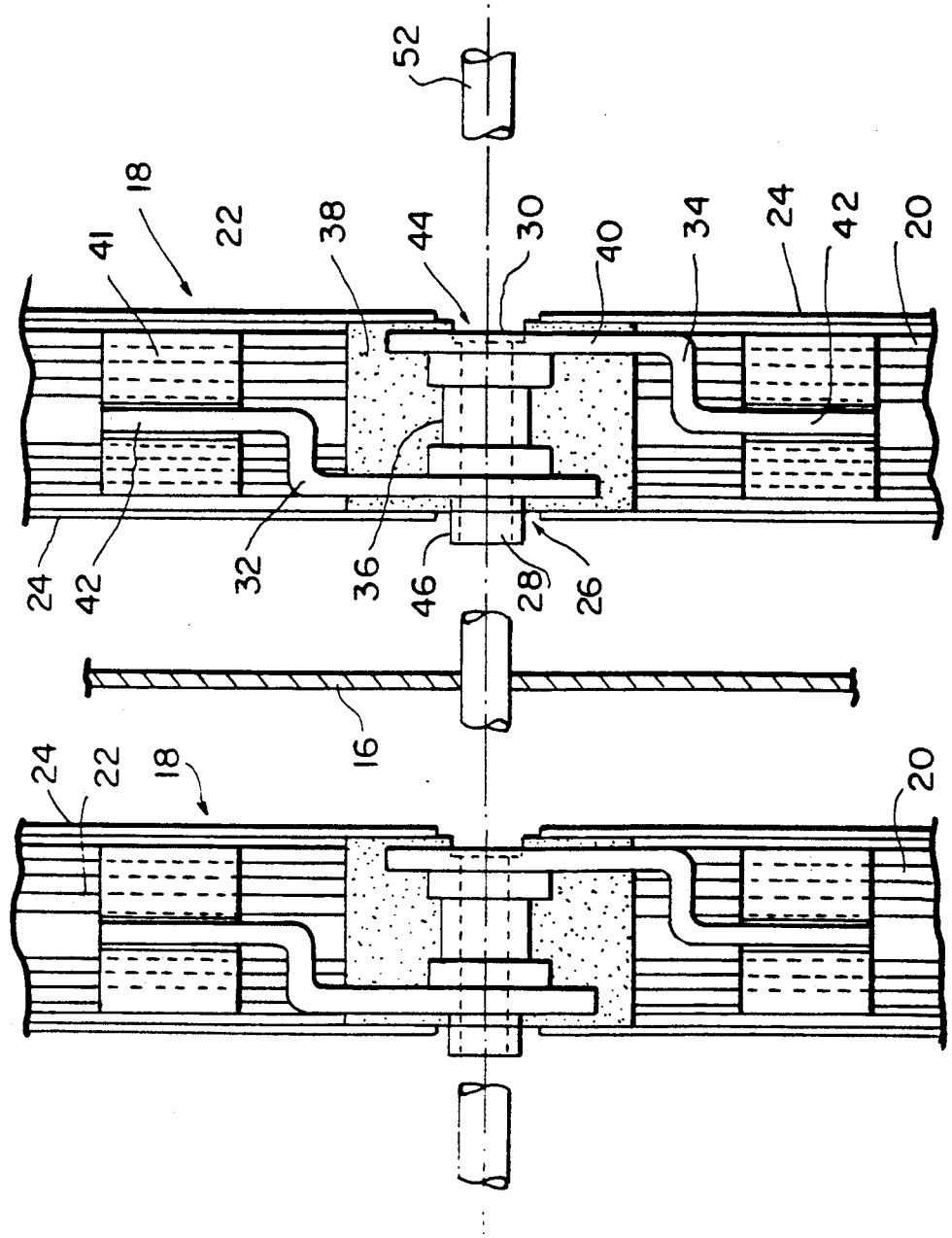
FIG. 2 is an exploded view illustrating a pair of cells of the battery in FIG. 1 including the intercell connector according to the present invention.
Figure 3:
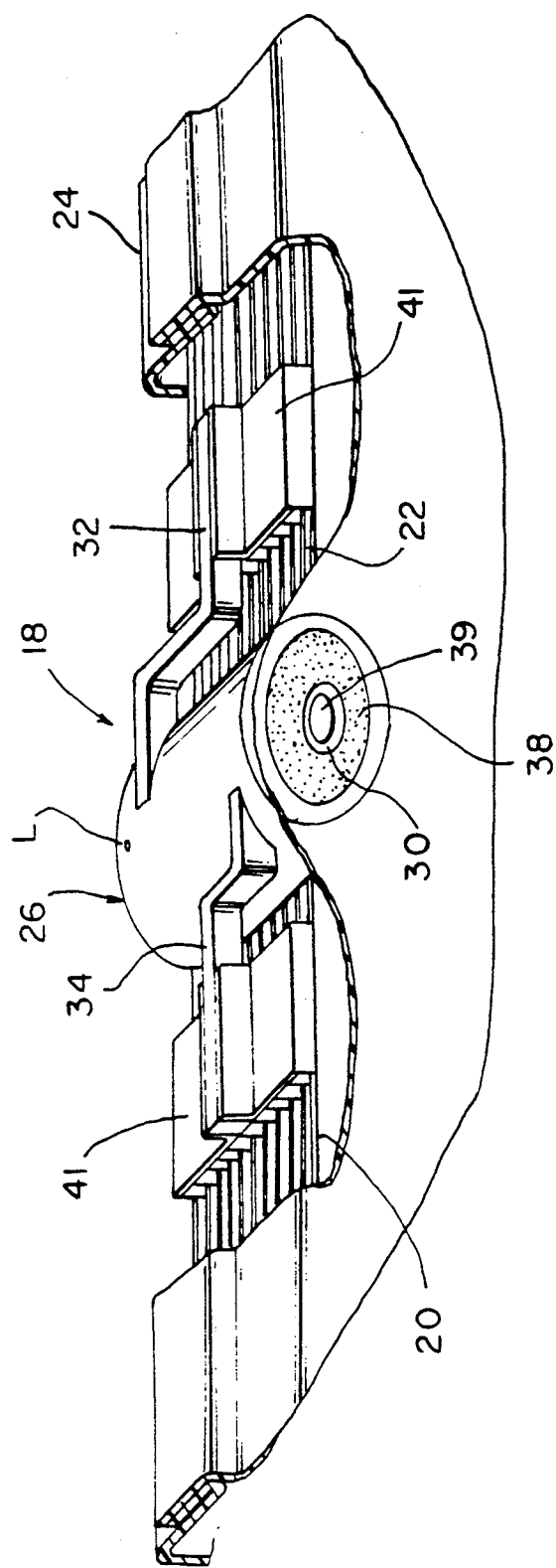
FIG. 3 is a perspective view of a cell including the intercell connector.

FIG. 2 is a top view illustrating two adjacent cells 18 separated by the fin 16 and FIG. 3 is a perspective view illustrating a single cell. Each cell 18 contains a repeating pattern of a gas diffusion screen (not shown), negative electrode plate 20, separator (not shown) and positive electrode plate 22. The arrangement and selection of the materials for these components is conventional and well within the skill of those familiar with the art. Each cell 18 is encased in a plastic casing 24 which electrically insulates the above mentioned components from the fins 16 and in which is provided an electrolyte solution. Also provided in the plastic casing 24 is an intercell connector 26 for respectively interconnecting the negative and positive electrode plates 20 and 22 to positive terminal 28 and a negative terminal 30.

Figure 4:
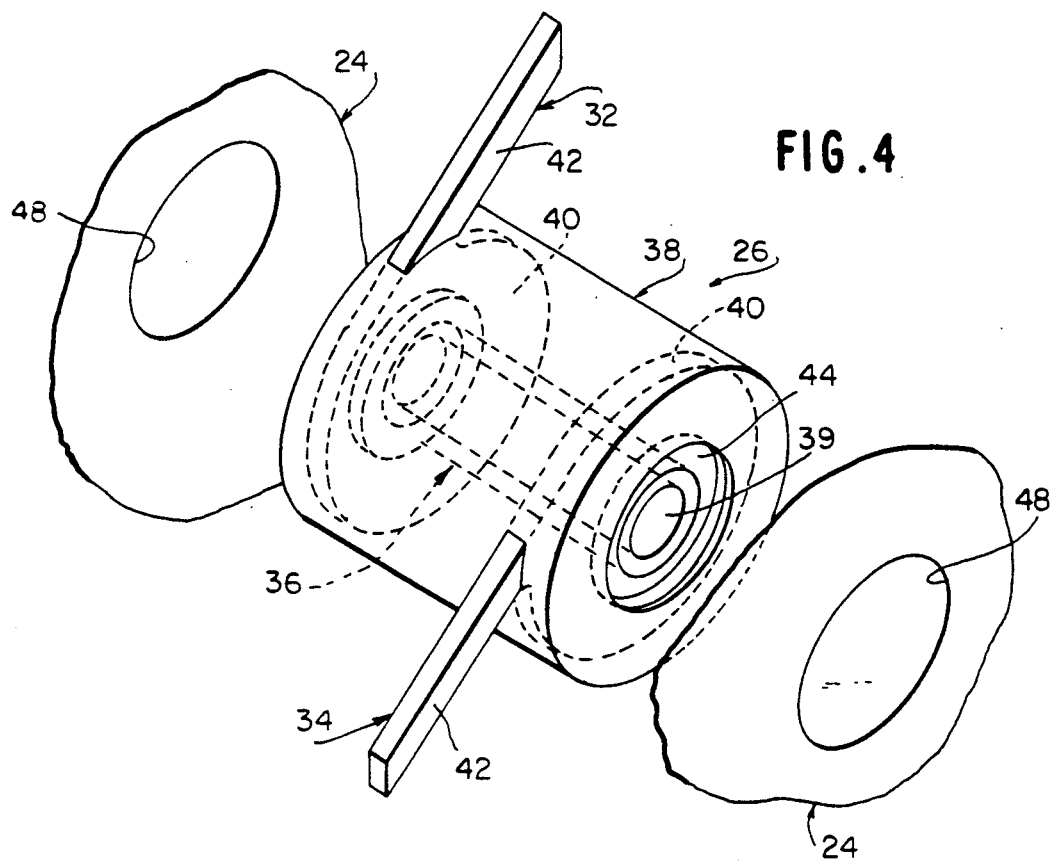
FIGS. 4 and 5 are perspective views of the intercell connector according to the present invention illustrating the manner in which the connector is bonded to the plastic casing of the cell.

The intercell connector 26 is also shown in FIGS. 3 and 4. The connector 26 includes a pair of buss bars 32, 34 which are spaced apart from one another by means of a tubular spacer 36 and insulated from one another by an insulator 38. Each of the buss bars include a disk-shaped base portion 40 having a hole 39 therein and an electrode connecting portion 42 extending tangentially from the base portion. The insulator 38 consists of molded plastic which substantially encapsulates the spacer 36 and the base portion 40 of each of the buss bars. The electrode connecting portions 42 of each of the buss bars protrude outwardly from the insulator as illustrated in FIG. 3 so that they can be respectively connected to the negative and positive electrode plates 20, 22 by welding respective tabs 41 of the electrodes to the electrode connecting portions 42, as illustrated in FIGS. 2 and 3. Of course, other known techniques may be used to fasten the tabs 41 to the electrode connecting portions 42.

Each of the buss bars 32, 34 are similarly configured with the exception that one of the buss bars 34 includes a recessed portion 44 corresponding to a female electrode terminal while the other buss bar 32 includes a protruding portion 46 corresponding to a male electrode terminal. The male and female electrode terminals respectively correspond to the above positive and negative terminals 28 and 30. Of course it is understood that the male terminal may be positive or negative with the female terminal being of the opposite polarity. In this manner, adjacent cells can be interconnected to one another by engaging the male terminal of one connector into the female terminal of the other connector, as discussed in greater detail below. Both the protruding portion 46 of the male terminal and the recessed portion 44 of the female terminal are exposed, that is, they are not covered by the insulator 38.

Figure 5:
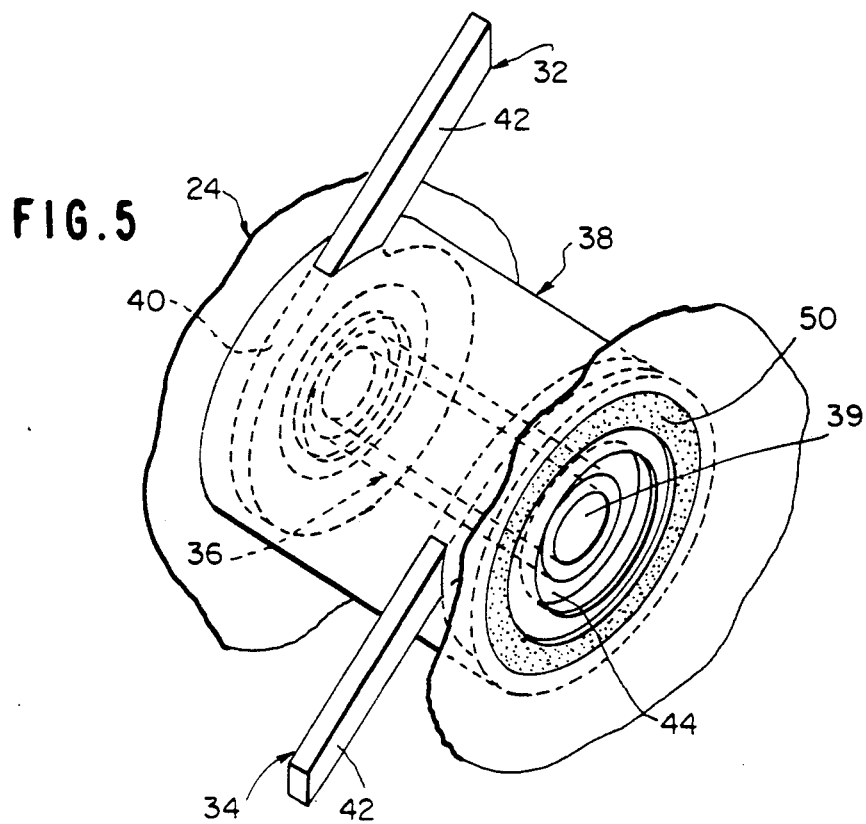

As explained above, the plastic casing 24 which encapsulates the electrodes includes opposing openings 48 as illustrated in FIG. 4. The connector 26 is positioned within the casing with the female or negative electrode terminal 30 aligned with one of the holes and the male or positive terminal 28 aligned with the opposite hole. In order to prevent the liquid electrolyte from leaking from the casing, the portions of the plastic casing 24 around the perimeter of the openings 48 are heat sealed to the plastic insulator 38 as identified by reference numeral 50 in FIG. 5 in such a manner that the male and female terminals 28 and 30 are exposed to the exterior of the casing, as best illustrated in FIG. 5. Since the plastic casing is being bonded to the plastic insulator 38, superior sealing performance can be achieved thereby preventing leakage of the liquid electrolyte from the casing and attendantly extending the life of the battery.

FIG. 2 illustrates the manner in which the connectors can be interconnected to one another by engaging the male terminal 28 of one intercell connector with the female terminal 30 of the adjacent intercell connector. In order to retain the cells together, a rod 52 is passed through the axial hole 39 in each of the connectors with one end of the rod including a head (not shown) and the other end of the rod being threaded (not shown) for receiving a nut so as to urge the cells together. Of course, it is understood that a ny other known technique may be used to interconnect the cells.

The following is a description of the manner in which the connector is manufactured. The interconnector 26 is formed utilizing an injection molding process. In particular, the spacer 36 and the buss bars 32, 34 are fixedly secured in the die in the proper orientation and a polymer is injected into the cavity defined by the dies. It is important that the polymer be of a type which positively adheres to the metal buss bars. One known type of such a metal adhering copolymer is PRIMACOR ® made by Dow Chemical. The PRIMACOR ® polymer is obtained by the co-polymerization of ethylene and acrylic acid, and is a polymer with carboxyl groups randomly distributed along the molecular chain. The carboxyl groups disrupt crystallinity, cause the polymer to be more amorphous than LDPE and lowers its melting point, thus providing excellent low temperature sealability. The carboxyl groups also provide sites for the intermolecular hydrogen bonding, as well as exceptional adhesion to polar substrates. Another similar material is NUCREL ® manufactured by DuPont.

A second type of polymer material is an ionomer including SURLYN ® made by DuPont. SURLYN ® is obtained by partially reacting ethylene and methacrylic acid co-polymers with metallic salts, resulting in a tough, transparent and chemically and temperature resistant material which adheres well to metals.

With the above described intercell connector, the electrolyte solution provided in the plastic casing is substantially prevented from leaking through the opening in the casing due to the bonding of the casing to the plastic insulator. Therefore, the life of the battery is maximized.

Although preferred embodiments of the invention have been described, it is believed that numerous modifications and alterations thereto would be apparent to one of ordinary skill in the art without departing from the spirit and scope of the invention. For example, although it is preferred to practice the invention with a common pressure vessel type battery, the invention can be applied to batteries having individual pressure vessels. Further, the invention can be applied to batteries other than those of the Ni-$H_2$ type.

What is claimed is:

1. An intercell connector for electrically interconnecting a plurality of battery cells, each of said battery cells including a plurality of spaced apart positive and negative electrode plates encased in a plastic casing, said connector comprising:

first and second buss bars disposed in spaced apart relation to each other and each including a base portion and an electrode connecting portion extending from said base portion, said base portions of said first and second buss bars respectively including first and second electrode terminals aligned in a longitudinal direction; and insulating means for insulating said first and second buss bars from each other, wherein said connector is disposed in said casing of each of said cells so as to extend transversely to said electrode plates with said casing being bonded to a portion of said insulating means such that only said electrode terminals are exposed outside said casing to allow interconnection of said connector with adjacent connectors and wherein said electrode connecting portions of said first and second buss bars are respectively electrically connected to said positive and negative electrodes.

2. The intercell connector of claim 1, further comprising a spacer disposed between said buss bars for maintaining a space between said buss bars.

3. The intercell connector of claim 1, wherein said insulating means encapsulates said buss bars excluding said electrode connecting portions and said electrode terminals.

4. The intercell connector of claim 1, wherein said insulating means includes a plastic which adheres to metal.

5. The intercell connector of claim 1, wherein said first electrode terminal includes a female connecting portion and said second electrode terminal includes a male connecting portion.

6. A battery, comprising:
a pressure vessel;
at least one rack disposed within said pressure vessel and including a plurality of fins dividing said rack into a plurality of compartments; and
a plurality of battery cells, at least one of said battery cells being disposed in each of said compartments, said cells each including a plurality of spaced apart positive and negative electrode plates, a plastic casing in which said electrode plates are sealed and an intercell connector bonded to said plastic casing, said connector including positive and negative electrode terminals disposed externally of said plastic casing and connecting means for respectively electrically connecting said positive and negative electrode plates to said positive and negative electrode terminals, wherein said positive and negative electrode terminals are respectively connectable to negative and positive electrode terminals of adjacent cells.

7. The battery of claim 6, wherein said connecting means comprises first and second buss bars disposed in spaced apart relation to each other and each including a base portion and an $ electrode connecting portion extending from said base portion, wherein said connecting portion of said first buss bar is connected to said positive electrode plates and said connecting portion of said second buss bar is connected to said negative electrode plates and wherein said base portions of said first and second buss bars respectively include said positive and negative electrode terminals; and insulating means for insulating said first and second buss bars from each other.

8. The battery of claim 7, wherein said connector is disposed in said casing of each of said cells so as to extend transversely to said electrode plates with said casing being bonded to a portion of said insulating means such that only said electrode terminals are exposed outside said casing to allow interconnection of said connector with adjacent connectors.

9. The battery of claim 8, further comprising a spacer disposed between said buss bars for maintaining a space between said buss bars.

10. The intercell connector of claim 8, wherein said insulating means encapsulates said buss bars excluding said electrode connecting portions and said electrode terminals.

11. The intercell connector of claim 10, wherein said insulating means includes a plastic which adheres to metal.

12. The intercell connector of claim 8, wherein said first electrode terminal includes a female connecting portion and said second electrode terminal includes a male connecting portion.

* * * * *